US007399158B2

(12) United States Patent  (10) Patent No.: US 7,399,158 B2
Care et al.  (45) Date of Patent: Jul. 15, 2008

(54) BLADE ARRANGEMENT

(75) Inventors: Ian C D Care, Derby (GB); Alison J McMillan, Uttoxeter (GB); Seamus Garvey, Notttingham (GB)

(73) Assignee: Rolls-Royce plc, London (GB)

( * ) Notice: Subject to any disclaimer, the term of this patent is extended or adjusted under 35 U.S.C. 154(b) by 640 days.

(21) Appl. No.: 11/104,485

(22) Filed: Apr. 13, 2005

(65) Prior Publication Data
US 2005/0254940 A1 Nov. 17, 2005

(30) Foreign Application Priority Data
May 13, 2004 (GB) .................................. 0410778.5

(51) Int. Cl.
*F01D 25/06* (2006.01)
(52) U.S. Cl. .............................. 416/1; 416/16; 416/500; 415/10; 415/119
(58) Field of Classification Search ................. 416/500, 416/61, 1; 415/10, 119
See application file for complete search history.

(56) References Cited

U.S. PATENT DOCUMENTS

| 4,722,668 | A | | 2/1988 | Novacek |
| 5,490,759 | A | | 2/1996 | Hoffman |
| 5,709,527 | A | | 1/1998 | Ernst |
| 6,213,737 | B1 | * | 4/2001 | Murakami et al. ....... 417/423.4 |
| 2003/0213660 | A1 | * | 11/2003 | Bhattacharya et al ....... 188/267 |

FOREIGN PATENT DOCUMENTS

GB  0 217 924  3/1995

* cited by examiner

*Primary Examiner*—Ninh H Nguyen
(74) *Attorney, Agent, or Firm*—W. Warren Taltavull; Manelli Denison & Selter PLLC

(57) ABSTRACT

A blade arrangement 31 includes an array of radially extending blades 20, which may for example comprise a fan of a gas turbine engine for an aircraft. The blades 20 are mounted for rotation about a central axis X-X. The blade arrangement 31 further includes a damping arrangement 32 comprising means 34 for inducing an axi-symmetric magnetic field whose axis of symmetry coincides with the central axis X-X of rotation of the blades 20. The damping arrangement 32 is configured such that when the magnetic field is induced, any movement of the blade 20 other than pure rotation about the central axis results in the magnetic field causing a force to be exerted on the blade 20, the force resisting such movement. The damping arrangement may be provided with means for inducing the magnetic field only when there is an increased likelihood of vibration of the blades, for example when a foreign body has entered the air intake of the engine.

27 Claims, 5 Drawing Sheets

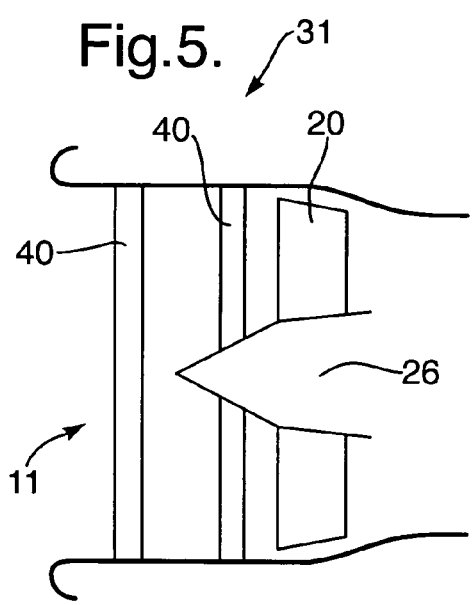
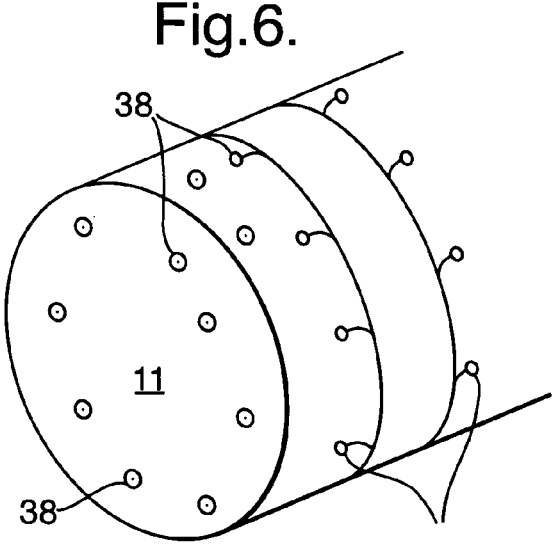
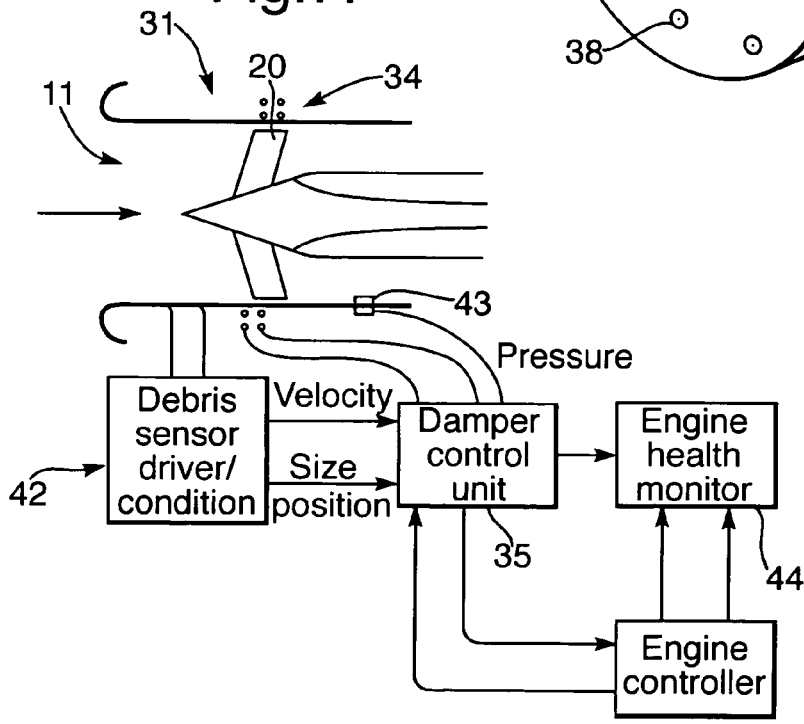

BLADE ARRANGEMENT

The invention relates to a blade arrangement, particularly but not exclusively for a gas turbine engine for an aircraft.

The blades of fans, propellers, compressors and turbines of aircraft engines are generally mounted on a rotor so as to extend radially outwardly from a central axis and to rotate about that axis. A casing is usually provided around the tips of the blades, remote from the rotor, for containment of the blades should one of them break off the rotor. The casing may also enhance the aerodynamic flow over the blades.

Blades may be subject to vibration excitation from numerous different sources. When there is any type of obstruction in front of or behind the blade arrangement, the flow of fluid over the blades is not uniform and the lack of uniformity in the fluid stream can excite some components of vibration in the blades. Another source of excitation arises when the blades are struck by objects borne in the fluid stream. A particular case of this is the widely appreciated phenomenon of bird strike for aircraft engines.

It is desirable that the above vibrations in blades are damped in order to limit the vibration amplitude and number of cycles of significant stress in the blades.

It is conventional for the casing around the blades to be made from a sacrificial material which is worn away by the blades. This ensures a minimum tip clearance between the tips of the blades and the internal surface of the casing. The size of this clearance gap is very important in determining the efficiency of the blade stage. When the blades vibrate in an axial direction, this causes additional wearing away of the sacrificial material, resulting in an axially elongated groove. This can reduce the efficiency of the blade stage in addition to contributing to possible fatigue of the blades. Limiting this axial displacement would increase the blade fatigue life, which could make significant weight reduction possible.

The present invention is concerned with the damping of blade vibrations, particularly vibrations in an axial direction of the engine.

According to the invention there is provided a blade arrangement including an array of radially extending blades mounted for rotation about a central axis, characterised in that the blade arrangement further includes a damping arrangement comprising means for inducing an axi-symmetric magnetic field whose axis of symmetry coincides with the central axis of rotation of the blades, the damping arrangement being configured such that when the magnetic field is induced, any movement of a blade other than pure rotation about the central axis results in the magnetic field causing a force to be exerted on the blade, the force resisting such movement.

Preferably the damping arrangement includes a current carrying conductor. The conductor preferably forms a loop around the array of blades, the loop being arranged axi-symmetrically around the central axis of rotation of the blades. The damping arrangement may include a plurality of such conductors. Alternatively, loops may be formed from a single conductor wound many times in a close packed helix, with direction changes preferably clockwise, anticlockwise, and then clockwise again, so that the total number of clockwise loops is equal to the total number of anticlockwise loops.

The blade arrangement may further include a casing which surrounds the array of blades. The conductors may be mounted on or in the casing.

Preferably the blades are elongate, including blade tips remote from the central axis. Preferably the damping arrangement includes means for inducing a magnetic field having its maximum field strength in the region of the blade tips.

The damping arrangement may include means for inducing the magnetic field only on receiving an initiation signal, which may indicate an increased likelihood of vibration of the blades.

The blade arrangement may include a controller for providing the initiation signal. The controller may be configured to provide the initiation signal at times when resonant vibration of the blades is likely.

The blade arrangement may comprise a fan, propeller, compressor or turbine stage for a gas turbine engine for an aircraft. In this case the control means may be configured to provide the initiation signal at least during take off.

The blade arrangement may further include a sensor arrangement for location in the gas turbine engine in a position axially forward of the array of blades. The sensor arrangement may include a plurality of sensors for sensing foreign bodies entering the engine. The sensors may be electrostatic, capacitive, optic or other sensors configured for mounting around a periphery of an intake region of the engine. Preferably the controller is configured to provide the initiation signal a calculated time period after a foreign body is sensed. The controller may include a processor provided with inputs indicative of the distance of each sensor from the array of blades and the speed of travel of the engine and configured to calculate the time period depending upon the inputs.

The controller may be configured to provide the initiation signal for a predetermined time period only. The time period may be between 0.1 and 2 seconds. The controller may also be used to store information about the usage of the damping system and/or about debris ingestion, and may thus instruct manual inspection or be used to predict component life (reduction).

According to the invention there is further provided a gas turbine engine comprising a blade arrangement according to any of the preceding definitions. The blade arrangement may comprise a fan, propeller, compressor or turbine stage for the gas turbine engine.

According to the invention there is further provided a method of damping blades of a blade arrangement including an array of radially extending blades mounted for rotation about a central axis, characterised in that the method includes the step of inducing an axi-symmetric magnetic field whose axis of symmetry coincides with the central axis of rotation of the blades, the magnetic field being such that any movement of a blade other than pure rotation about the central axis results in the magnetic field causing a force to be exerted on the blade, the force resisting such movement.

Preferably the method includes the step of causing a current to flow in a conductor which forms a loop around the array of blades.

The method may include the step of inducing the magnetic field only on receiving an initiation signal, which may indicate an increased likelihood of vibration of the blades. The method may include the step of providing the initiation signal at times when resonant vibration of the blades is likely.

The method may be for damping blades in a blade arrangement comprising a fan, propeller, compressor or turbine stage for a gas turbine engine for an aircraft. In this case, the initiation signal may be provided at least during vulnerable times, such as take-off.

The method may further include the step of providing a sensor arrangement located in the gas turbine engine in a position axially forward of the array of blades. The method may include the step of using the sensors to sense foreign bodies entering the engine. The method may include the step of providing the initiation signal a calculated time period after a foreign body is sensed. The method may include the step of providing inputs indicative of the distance of each sensor from the array of blades and the relative speed of travel of the air entering the engine and the aircraft and thereby calculating the time period depending upon the inputs.

The method may include the step of providing the initiation signal for a predetermined time period only. The method may also provide an input into an engine health monitoring system, which might track the number of high amplitude vibrations and thereby assess the remaining useful safe component life.

An embodiment of the invention will be described for the purpose of illustration only with reference to the accompanying drawings in which:—

FIG. 5 is a diagrammatic sectional view of a blade arrangement according to a second embodiment of the invention;

FIG. 6 is a diagrammatic illustration of an arrangement of sensors for the embodiment of FIG. 5; and FIG. 7 is a diagrammatic sketch illustrating the functioning of the embodiment of FIGS. 5 and 6.

Figure 1:
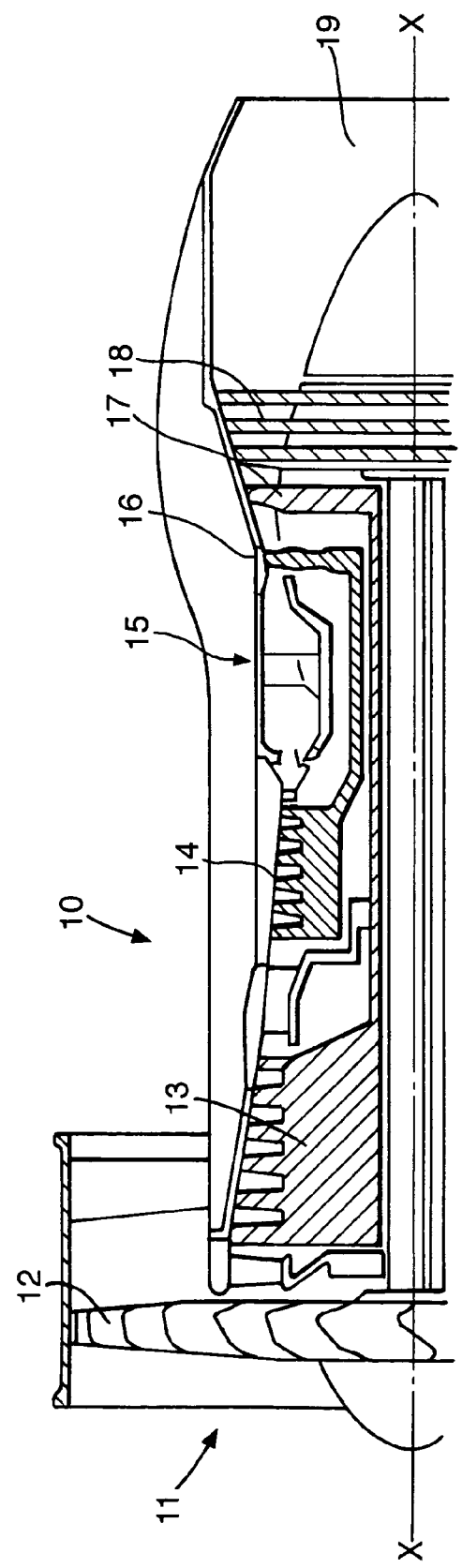
FIG. 1 is a diagrammatic sectional view of a gas turbine engine for an aircraft.

Referring to FIG. 1, a gas turbine engine is generally indicated at 10 and comprises, in axial flow series, an air intake 11, a propulsive fan 12, an intermediate pressure compressor 13, a high pressure compressor 14, a combustor 15, a turbine arrangement comprising a high pressure turbine 16, an intermediate pressure turbine 17 and a low pressure turbine 18, and an exhaust nozzle 19.

The gas turbine engine 10 operates in a conventional manner so that air entering the intake 11 is accelerated by the fan 12 which produce two air flows: a first air flow into the intermediate pressure compressor 13 and a second air flow which provides propulsive thrust. The intermediate pressure compressor compresses the air flow directed into it before delivering that air to the high pressure compressor 14 where further compression takes place.

The compressed air exhausted from the high pressure compressor 14 is directed into the combustor 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13 and the fan 12 by suitable interconnecting shafts.

Figure 2:
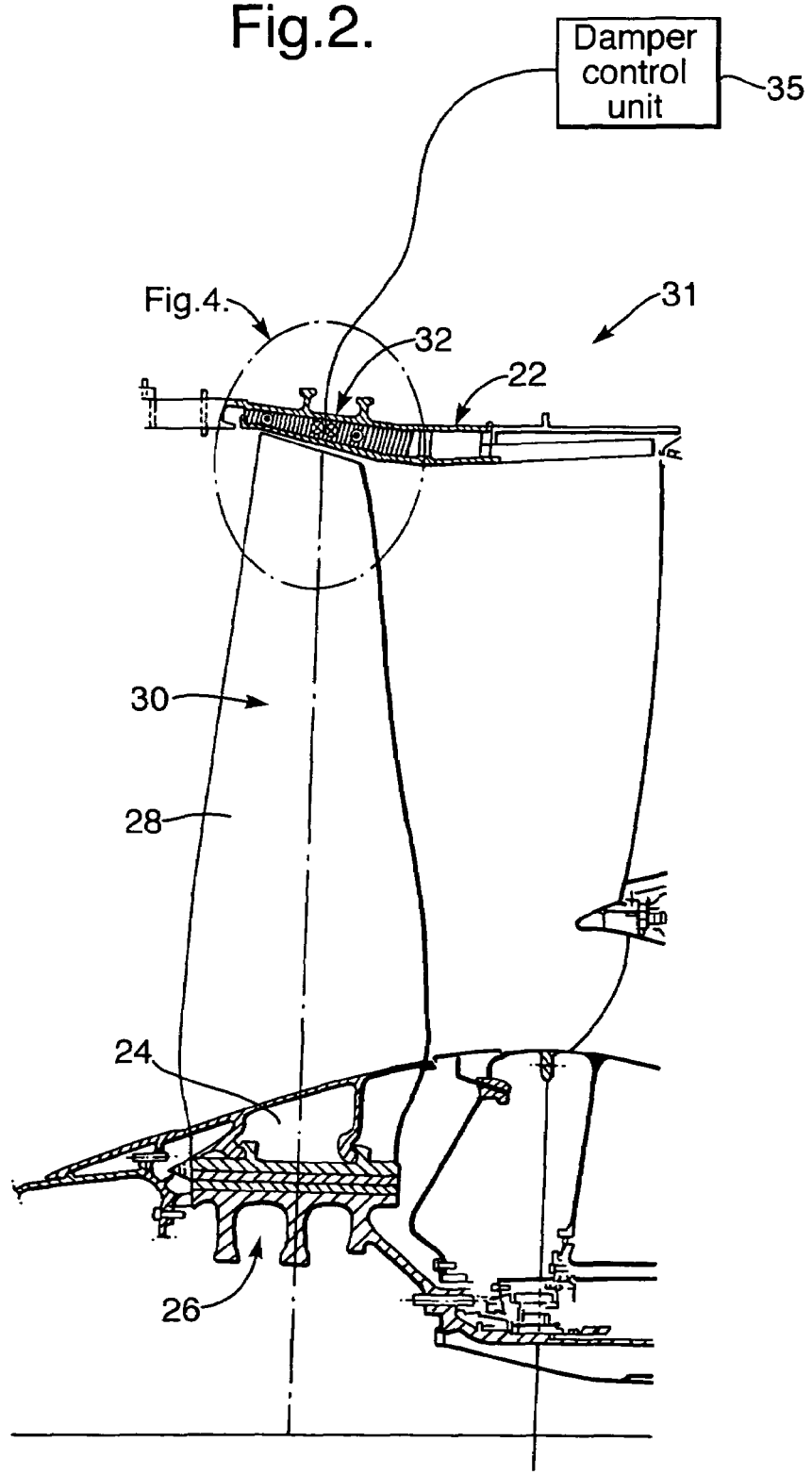
FIG. 2 is a diagrammatic sectional view of part of a blade arrangement according to one embodiment of the invention.

The fan, compressor and turbine of the above gas turbine engine each comprise one or more arrays of blades mounted on a rotor so as to extend radially outwardly therefrom. The blades are mounted such that they can rotate about a central axis, X-X (see FIG. 1) this coinciding with the central axis of the gas turbine engine. FIG. 2 shows a fan blade 20 mounted within a casing 22. The blade 20 includes a root portion 24 via which the blade 20 is mounted on a rotor 26, and an aerofoil portion 28, the radially outermost part of which comprises a blade tip 30. The casing 22 may be provided with a sacrificial material on its inner surface, the material being worn away by the blade tips 30 of the respective blades 20, thereby providing minimum blade tip clearance.

Figure 3A:
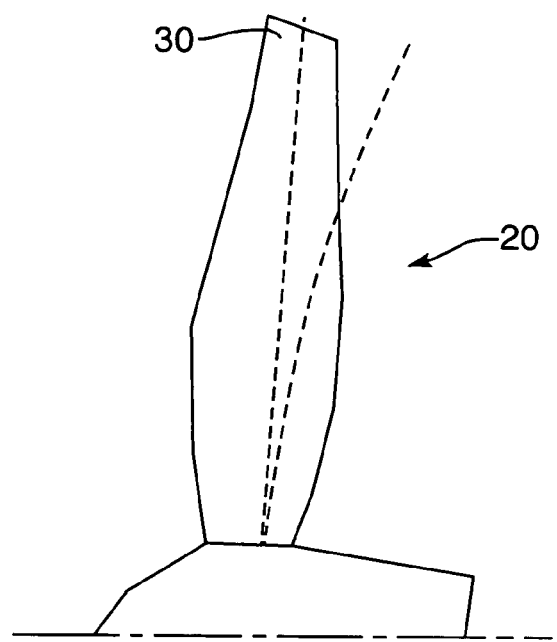
FIGS. 3A and 3B are diagrammatic perspective views of a fan blade illustrating vibration in a first flap mode and a second flap mode respectively.
Figure 3B:
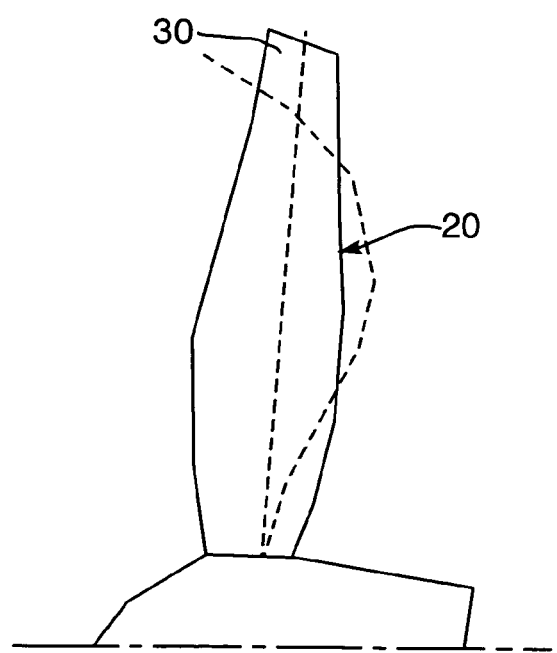

Referring to FIGS. 3A and 3B, vibration of the blade 20 can occur generally in an axial direction of the engine, in a first flap mode (see FIG. 3A) or a second flap mode (see FIG. 3B). Such vibration may cause significant axial movement of the blade tips 30. The resonance frequency associated with the first flap mode is typically just above first engine order, generally around 450 rad/s. The second flap resonance frequency might be in the order of 750 rad/s. It is desirable that these modes of vibration in particular are damped.

Vibration may also be caused by foreign bodies entering the engine and either contacting the blades or at least disrupting the airflow over the blades. This is a particular problem with fan blades. It is therefore also desirable to damp out vibration caused by such foreign bodies.

If vibration is not damped out, blades may quickly fatigue and can break off, usually (but not always) near to their roots. In addition, the vibration of the blades in the axial direction wears an excessively large groove in any sacrificial material of the casing, thus reducing efficiency.

Figure 4:
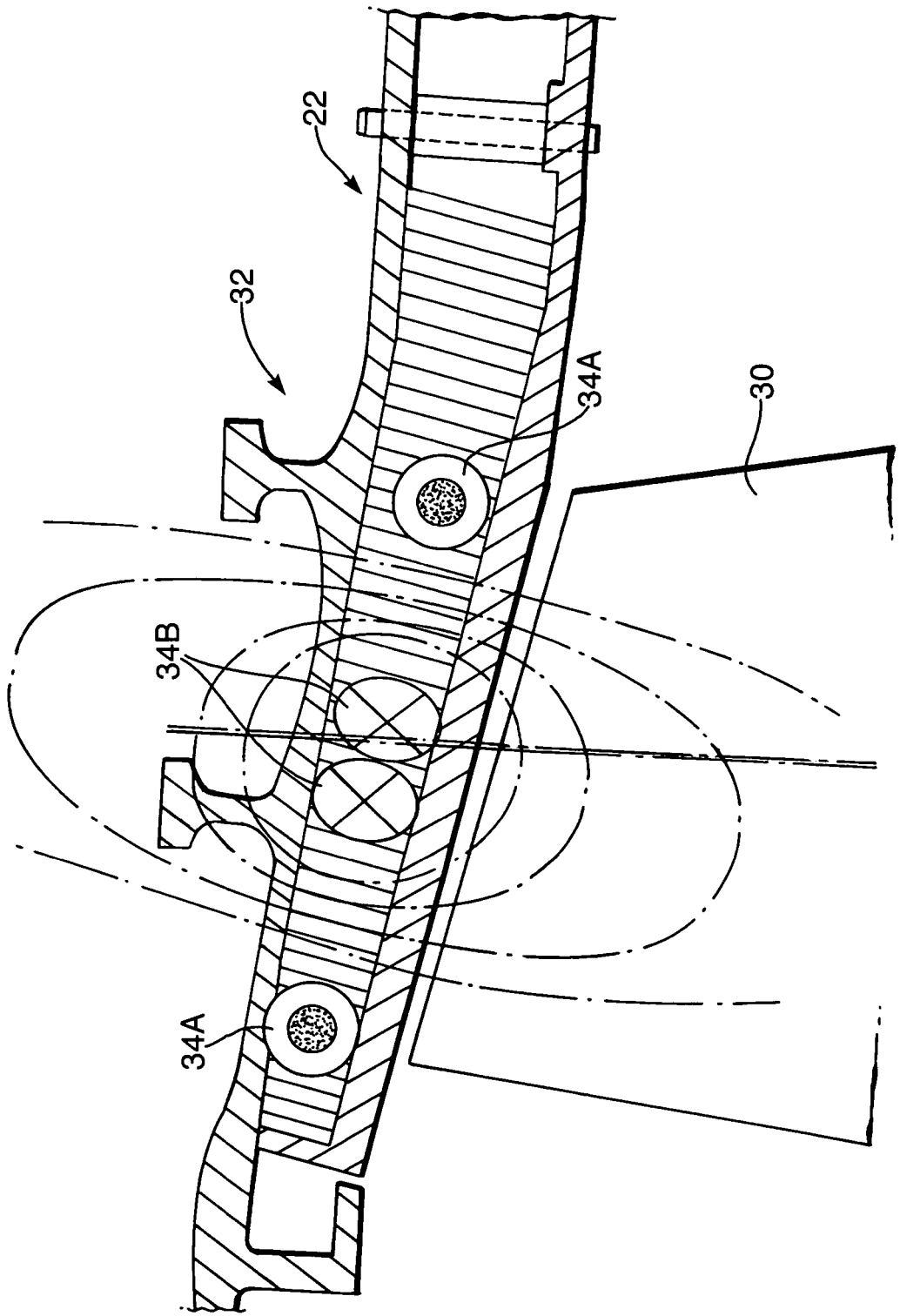
FIG. 4 is an enlarged detail of FIG. 2.

Referring to FIGS. 2 and 4, a blade arrangement 31 according to one aspect of the invention includes a damping arrangement 32 comprising in this example two pairs of rings of electrical conductors 34A, 34B. Two of the rings 34A are arranged to conduct electrical current in a clockwise direction about the axis of the machine and the other two rings 34B are arranged to conduct the same electrical current in an anticlockwise direction about the axis of the machine (as viewed from the air intake). The damping arrangement could include just one pair of rings of electrical conductors, or more than two pairs.

The current through the rings 34A and 34B is controlled by a controller in the form of a damper control unit 35 (shown highly diagrammatically in FIG. 2) which provides an initiation signal when the current is to flow. When current flows through the rings 34A, 34B it results in an axi-symmetric magnetic field, the axis of the field coinciding with the axis of rotation X-X of the fan blades 20. The net magnetic dipole created is zero so that the field strength dies away very quickly at any significant distance away from the conductors. The field strength is at a maximum near the tips 30 of the blades.

When the magnetic field cutting through an electrically conductive body changes with time, electromagnetic fields are induced in that body and eddy currents are caused to flow. These currents in turn induce fields, and the direction of the current is always such that the fields induced oppose the change in the magnetic field.

The magnetic field cutting through any conductive body may be caused to change by either:
(a) changing the magnitude/distribution of the magnetomotive force which caused the magnetic field to exist in the first place; or
(b) movement of the field relative to the conductive body.

In general therefore if a conductive body located in a magnetic field is moved, this will result in a change in the distribution of lines of magnetic flux cutting through the body and result in a force on the body. However, with an axi-symmetric field, rotation of a body about the axis of symmetry will not cause any change in the distribution of lines of magnetic flux cutting through the body. Thus, rotation of the fan blades about the central axis X-X does not cause any change of distribution of lines of magnetic flux cutting through the blades. Therefore this causes no force on the blades and, provided the blades continue to rotate in this way without undergoing any other movement, the magnetic field does not slow the blades down or take any energy from the blades.

However, any motion of the fan blades other than a pure rotation about their central axis will result in a change in the lines of flux cutting the blades. This will result in eddy currents being induced and the force will resist the movement of the blade. For example, if the blade starts to vibrate in an axial direction, this vibration causes eddy currents and the effect of the resulting force is to damp the vibration.

The shape and configuration of a blade 20 in many engines is such that its tip 30 is solid, as opposed to the main body of the aerofoil portion 28, which is hollow or partially comprised of non-metallic material. Thus, eddy currents tend to be primarily induced in the tip portion 30, thus assisting the damping action.

The controller may be configured such that the initiation signal causes current to flow through the conductors 34A, 34B at times when blade vibration is particularly likely. For example, current may be caused to flow through the conductor during take-off or at engine speeds which are known to trigger resonant vibration of the blades.

FIGS. 5 to 7 illustrate a further embodiment of the invention in which the damper control unit 35 may cause the initiation means to trigger the flow of current only or particularly at certain times when additional damping is required. Referring to FIGS. 5 to 7, there is indicated a fan blade arrangement 31 comprising a plurality of fan blades 20 mounted on a rotor 26 in a gas turbine engine. The air intake 11 of the gas turbine engine is provided with a plurality of electrostatic debris sensors 38 arranged in tomography configuration. The sensors may be located on tapes 40 attached to the air intake.

Sensor arrangements are described in U.S. Pat. No. 3,775,763, WO 8,401,438 and EP 0,256,845.

The sensors 38 are able to detect particles entering the air intake 11 and, by using several sensors and tomography software, the polar position and approximate particle size can be determined by software in a debris sensor unit 42. A number of sensors 38 can be used to track the progress of a particle and thus to provide a value for its velocity.

The sensors 38 are axially spaced, with one sensor as close to the engine as possible. The sensors are also radially spaced. The sensors monitor an electrostatic charge, the charge signals being converted to voltage signals using a charge amplifier, filter and signal conditioning electronics in the sensor unit 42. The signals from the sensors are processed to produce charge and velocity values which are passed to the damper control unit 35. The combination of these values can be used by the damper control unit 35 to determine whether the debris material is potentially damaging or dangerous and to calculate the likely impact on the fan blades.

The above information can be used to determine whether damping is required and the amount of damping necessary. A signal can then be provided by the damper control unit 35, to cause current to flow through the coils 34A, 34B thus activating the damping arrangement.

The current will generally be held on for a time period which is at least several times longer than the periodic time of the vibrations to be damped, but not so long that the coil overheats. (The temperature of the coil is likely to rise almost linearly with time, and the coil design must be such that the conductor and insulation is still below thermal breakdown at the end of the damping period). Alternatively, the current may be held on for longer periods if the coil is super conducting.

A sensor 43 may be provided to detect blade flutter and initiate blade damping. This may be through a differential pressure, absolute pressure or stall wire measurement/detection.

Parameters from the engine controller 45 may be used to predict that blades will change speed or otherwise be more likely to vibrate.

The damper control unit 35 may also pass signals to an engine health monitor 44, which monitors and reports on the overall condition of the engine.

For large debris, a high damping level is required which would require the transfer of a significant charge into an inductive coil. Preferably, this is done by utilising a dual coil system, using one coil set to store the energy before switching or pulsing across into the other coil set, the coils being set up as a resonant pair L-C circuit. Thus both coils would act in changing the magnetic flux and so produce damping that could be switched quickly. Preferably, the coils have identical but opposite total axial MMFs (magneto motive forces).

According to the above described preferred embodiment, there is thus provided a damping arrangement which only effects damping when required. The current may flow permanently in the coils 34 but would only have a damping effect when the blade 20 vibrated (i.e. would not take any energy out of the rotating blades normally) or the current may only flow when a signal indicates that damping is required, for example when debris is sensed. This is an improvement over existing arrangements which tend to take energy out of the blades even when damping is not required. The above arrangement also has the advantage that it does not add any weight to the blades.

Various modifications may be made to the above described embodiment without departing from the scope of the invention. For example, the configuration of the damper coils may be changed, as may the way in which the coils are activated or charged. The above embodiment is shown used on the fan 12 but could alternatively be applied to the compressors 13, 14 or the turbines, 16, 17, 18, taking into account the increased temperature environment. Although the invention has been described using an electromagnet, a permanent magnet could be used, which would be effective at all times, with no losses Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A blade arrangement including an array of radially extending blades mounted for rotation about a central axis, characterised in that the blade arrangement further includes a damping arrangement comprising means for inducing an axi-symmetric magnetic field whose axis of symmetry coincides with the central axis of rotation of the blades, the damping arrangement being configured such that when the magnetic field is induced, any movement of a blade other than pure rotation about the central axis results in the magnetic field causing a force to be exerted on the blade, the force resisting such movement.

2. A blade arrangement according to claim 1, wherein the damping arrangement includes a current carrying conductor which forms a loop around the array of blades, the loop being arranged axi-symmetrically around the central axis of rotation of the blades.

3. A blade arrangement according to claim 2, wherein the damping arrangement includes a plurality of said conductors.

4. A blade arrangement according to claim 2, wherein the damping arrangement includes loops formed from a single conductor wound many times in a close packed helix configuration.

5. A blade arrangement according to claim 1, wherein the blade arrangement includes a casing which surrounds the array of blades, and the conductors are mounted on or in the casing.

6. A blade arrangement according to claim 1, wherein the blades are elongate, including blade tips remote from the central axis, and the damping arrangement includes means for inducing a magnetic field having its maximum field strength in the region of the blade tips.

7. A blade arrangement according to claim 1, wherein the damping arrangement includes means for inducing the magnetic field only on receiving an initiation signal.

8. A blade arrangement according to claim 7, wherein the blade arrangement includes a controller for providing the initiation signal, the controller being configured to provide the initiation signal at times when resonant vibration of the blades is likely.

9. A blade arrangement according to claim 1, wherein the blade arrangement comprises a fan, propeller, compressor or turbine stage for a gas turbine engine for an aircraft.

10. A blade arrangement according to claim 9, in which the damping arrangement includes means for inducing the magnetic field only on receiving an initiation signal, and in which the blade arrangement includes a controller for providing an initiation signal, wherein the controller is configured to provide the initiation signal at least during vulnerable periods, such as take off.

11. A blade arrangement according to claim 9, wherein the arrangement includes a sensor to detect blade vibration or flutter.

12. A blade arrangement according to claim 9, wherein the blade arrangement further includes a sensor arrangement for location in the gas turbine engine in a position axially forward of the array of blades, the sensor arrangement including a plurality of sensors for sensing foreign bodies entering the engine.

13. A blade arrangement according to claim 12, wherein the sensors are electrostatic sensors configured for mounting around a periphery of an intake region of the engine, and the controller is configured to provide the initiation signal a calculated time period after a foreign body is sensed.

14. A blade arrangement according to claim 13, wherein the controller includes a processor provided with inputs indicative of the distance of each sensor from the array of blades and the speed of travel of the engine and configured to calculate the time period depending upon the inputs.

15. A blade arrangement according to claim 14, wherein the controller is configured to provide the initiation signal for a predetermined time period only.

16. A gas turbine engine comprising a blade arrangement according to claim 1, the blade arrangement comprising a fan, propeller, compressor or turbine stage of the gas turbine engine.

17. A method of damping blades of a blade arrangement including an array of radially extending blades mounted for rotation about a central axis, characterised in that the method includes the step of inducing an axi-symmetric magnetic field whose axis of symmetry coincides with the central axis of rotation of the blades, the magnetic field being such that any movement of a blade other than pure rotation about the central axis results in the magnetic field causing a force to be exerted on the blade, the force resisting such movement.

18. A method according to claim 17, the method including the step of causing a current to flow in a conductor which forms a loop around the array of blades.

19. A method according to claim 17, the method including the step of inducing the magnetic field only on receiving an initiation signal indicating an increased likelihood of vibration of the blades.

20. A method according to claim 19, wherein the method includes the step of using engine operating parameters to predict requirements for damping, and this control the initiation signal.

21. A method according to claim 17, wherein the method is for damping blades in a blade arrangement comprising a fan, propeller, compressor or turbine stage for a gas turbine engine for an aircraft.

22. A method according to claim 21, wherein the initiation signal is provided at least during take-off.

23. A method according to claim 22, wherein the method further includes the step of providing a sensor arrangement located in the gas turbine engine in a position axially forward of the array of blades, and using the sensors to sense foreign bodies entering the engine.

24. A method according to claim 23, wherein the method includes the step of providing the initiation signal a calculated time period after a foreign body is sensed, based on inputs indicative of the distance of each sensor from the array of blades predicted position of impact of foreign body, and the relative speed of travel of the aircraft and thereby calculating the time period depending upon the inputs.

25. A method according to claim 24, wherein the method includes the step of providing the initiation signal for a predetermined time period only.

26. A method according to claim 24, wherein an input is provided to an engine health monitoring system, which may be used to predict the remaining useful safe life of components.

27. A method according to claim 23, wherein the method includes the step of determining the damping magnitude based on the size or mass of the foreign body.

* * * * *